(12) United States Patent
Penton et al.

(10) Patent No.: US 10,997,076 B2
(45) Date of Patent: May 4, 2021

(54) ASYMMETRIC COHERENCY PROTOCOL FOR FIRST AND SECOND PROCESSING CIRCUITRY HAVING DIFFERENT LEVELS OF FAULT PROTECTION OR FAULT DETECTION

(71) Applicant: ARM LIMITED, Cambridge (GB)

(72) Inventors: Antony John Penton, Little Canfield (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 232 days.

(21) Appl. No.: 15/780,726

(22) PCT Filed: Sep. 14, 2016

(86) PCT No.: PCT/GB2016/052839
§ 371 (c)(1),
(2) Date: Jun. 1, 2018

(87) PCT Pub. No.: WO2017/109449
PCT Pub. Date: Jun. 29, 2017

(65) Prior Publication Data
US 2018/0373630 A1 Dec. 27, 2018

(30) Foreign Application Priority Data
Dec. 21, 2015 (GB) ...................................... 1522538

(51) Int. Cl.
*G06F 12/00* (2006.01)
*G06F 12/084* (2016.01)
(Continued)

(52) U.S. Cl.
CPC ............ *G06F 12/084* (2013.01); *G06F 11/00* (2013.01); *G06F 11/004* (2013.01);
(Continued)

(58) Field of Classification Search
CPC .... G06F 12/084; G06F 11/00; G06F 12/0808; G06F 12/0842; G06F 12/0831;
(Continued)

(56) References Cited

U.S. PATENT DOCUMENTS

2013/0268798 A1 10/2013 Schade et al.
2018/0373630 A1* 12/2018 Penton ................ G06F 11/1695

OTHER PUBLICATIONS

International Search Report and Written Opinion of the ISA for PCT/GB2016/052839, dated Dec. 8, 2016, 11 pages.
(Continued)

*Primary Examiner* — Mardochee Chery
(74) *Attorney, Agent, or Firm* — Nixon & Vanderhye P.C.

(57) ABSTRACT

An apparatus has first processing circuitry and second processing circuity. The second processing circuitry has at least one hardware mechanism providing a greater level of fault protection or fault detection than is provided for the first processing circuitry. Coherency control circuitry controls access to data from at least part of a shared address space by the first and second processing circuitry according to an asymmetric coherency protocol in which a local-only update of data in a local cache of the first processing circuitry is restricted in comparison to a local-only update of data in a local cache of the second processing circuitry.

18 Claims, 6 Drawing Sheets

(51) Int. Cl.
   *G06F 12/0815* (2016.01)
   *G06F 11/00* (2006.01)
   *G06F 12/0808* (2016.01)
   *G06F 12/0842* (2016.01)
   *G06F 12/0831* (2016.01)
   *G06F 11/20* (2006.01)

(52) U.S. Cl.
   CPC ...... *G06F 11/2043* (2013.01); *G06F 12/0808* (2013.01); *G06F 12/0815* (2013.01); *G06F 12/0831* (2013.01); *G06F 12/0842* (2013.01); *G06F 2201/885* (2013.01); *G06F 2212/1048* (2013.01); *G06F 2212/604* (2013.01)

(58) Field of Classification Search
   CPC ............... G06F 11/2043; G06F 11/004; G06F 12/0815; G06F 2212/1048; G06F 2201/885; G06F 2212/604; G06F 11/1641; G06F 11/1695; G06F 11/0724; G06F 11/3024; G06F 15/8038
   USPC ........................................................ 711/130
   See application file for complete search history.

(56) References Cited

OTHER PUBLICATIONS

Combined Search and Examination Report for GB 1522538.6 dated Jun. 10, 2016, 6 pages.
Shield et al. "Asymmetric Cache Coherency: Improving Multicore Performance for Non-uniform Workloads", Reconfigurable Communication-Centric Systems-on-Chip (RECOSOC), 2011 6th International Workshop on, IEEE, Jun. 20, 2011, XP031926602, pp. 1-8.

* cited by examiner symmetric protocol

US 10,997,076 B2

ASYMMETRIC COHERENCY PROTOCOL FOR FIRST AND SECOND PROCESSING CIRCUITRY HAVING DIFFERENT LEVELS OF FAULT PROTECTION OR FAULT DETECTION

This application is the U.S. national phase of International Application No. PCT/GB2016/052839 filed Sep. 14, 2016, which designated the U.S. and claims priority to GB1522538.6 filed Dec. 21, 2015, the entire contents of each of which are hereby incorporated by reference.

The present technique relates to the field of data processing.

A coherency protocol may be used in a data processing system to manage access to a shared address space by two or more processing circuits. For example, each processing circuit may have a local cache and the coherency protocol may ensure that if a first processing circuit updates its data in the local cache, when other processing circuits later access data from the same address they see the most up to date version of the data held by the first processing circuit.

Some processing circuits designed for relatively safety-critical applications may be provided with a hardware mechanism for fault protection or fault detection.

At least some examples provide an apparatus comprising:
first processing circuitry;
second processing circuitry having at least one hardware mechanism providing a greater level of fault protection or fault detection than is provided for the first processing circuitry; and
coherency control circuitry to control access to data from at least part of a shared address space by the first processing circuitry and the second processing circuitry according to an asymmetric coherency protocol in which a local-only update of data in a local cache of the first processing circuitry is restricted in comparison to a local-only update of data in a local cache of the second processing circuitry.

At least some examples provide an apparatus comprising:
first means for processing;
second means for processing having at least one means for providing, using a hardware mechanism, a greater level of fault protection or fault detection than is provided for the first means for processing; and
means for controlling access to data from at least part of a shared address space by the first means for processing and the second means for processing according to an asymmetric coherency protocol in which a local-only update of data in a local cache of the first means for processing is restricted in comparison to a local-only update of data in a local cache of the second means for processing.

At least some examples provide a data processing method comprising:
processing data using first processing circuitry;
processing data using second processing circuitry having at least one hardware mechanism providing a greater level of fault protection or fault detection than is provided for the first processing circuitry; and
controlling access to data from at least part of a shared address space by the first processing circuitry and the second processing circuitry according to an asymmetric coherency protocol in which a local-only update of data in a local cache of the first processing circuitry is restricted in comparison to a local-only update of data in a local cache of the second processing circuitry.

Further aspects, features and advantages of the present technique will be apparent from the following description of examples, which is to be read in conjunction with the accompanying drawings, in which:

FIG. 1 schematically illustrates an example of an apparatus having first and second processing circuitry, where the second processing circuitry has at least one hardware mechanism providing a greater level of fault protection or fault detection than is provided for the first processing circuitry;

Figure 1:
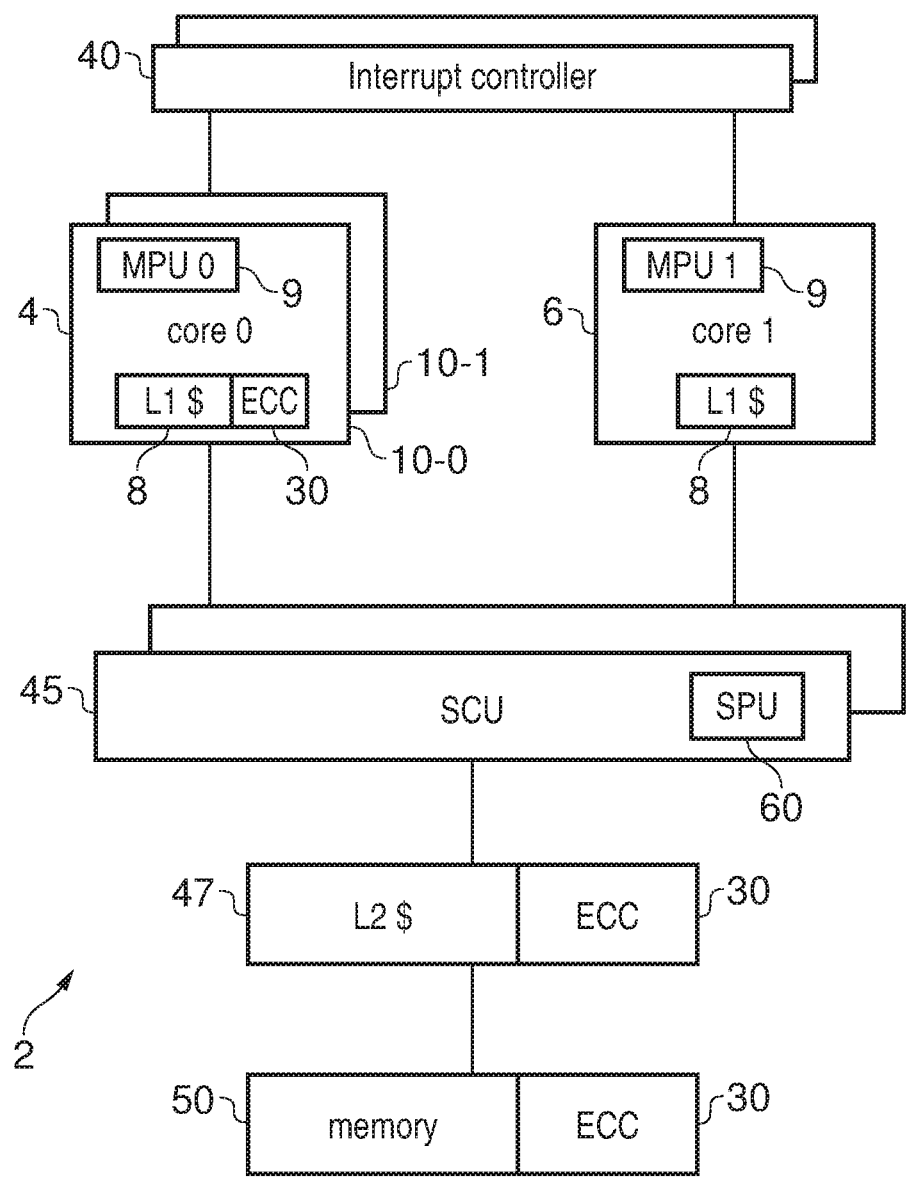

Some specific examples are discussed below. It will be appreciated that the present technique is not limited to these examples.

Processing circuitry may be provided with at least one hardware mechanism for fault protection or fault detection, to guard against hardware faults (such as single event upsets caused by an alpha particle strike for example) causing errors, which if undetected and may affect the validity of the processing being performed. This is particularly useful for processing devices which are designed for certain safety-critical applications, e.g. a processor which controls the braking system in a vehicle, a processor for controlling the operation of an aircraft, or a processor used in an industrial environment such as a factory or power plant for controlling certain safety-critical tasks (e.g. the control of a nuclear power station).

However, alongside the safety-critical functions, there may also be other processing functions to be performed which are less safety-critical. For example, in the automotive field, processing for controlling the audio system or satellite navigation in a vehicle may be less safety critical than processing for controlling the braking or steering for example. While the safety-critical functionality and the less safety-critical functionality could be performed by entirely separate processor devices, increasingly there is a desire to consolidate different tasks onto a single control unit to reduce costs. The less safety-critical functions could be performed using the same processing circuit as the safety-critical functions. However, the hardware fault protection/detection mechanism may incur a certain cost in terms of circuit area and performance (e.g. the hardware mechanism may perform processing with a certain level of redundancy which may increase processing time and power consumption). This extra cost may not be justified when carrying out the less safety-critical functions.

Therefore, an apparatus may be provided with first and second processing circuitry, where the second processing circuitry has at least one hardware mechanism providing a greater level of fault protection or fault detection than is provided for the first processing circuitry. In this way, the second processing circuitry can be used for the more safety-critical tasks, but when less safety-critical tasks are required then these can be carried out using the first processing circuitry, so that the cost of the fault protection/detection mechanism is not incurred when performing less safety-critical functionality.

The first and second processing circuitry may have access to a shared address space. For example, there may be a common memory shared between the first and second processing circuitry. A coherency protocol may be used to control access to the shared address space by the first and second processing circuitry. For example the coherency protocol may manage read or write requests from each processing circuitry to ensure that when one processing circuitry updates some data then the other processing circuitry sees the latest version of that data.

However, in a system having processing circuitry with different levels of fault protection/detection which can access data from a common address space, there can be a risk that faults occurring in the first processing circuitry could silently propagate errors to the second processing circuitry which may remain undetected. For example, if the first processing circuitry has a local cache and performs a local-only update of data in the local cache, and then a fault occurs in the first processing circuitry which is not detected because the first processing circuitry does not have the same level of fault protection/detection that is provided for the second processing circuitry, the updated data may remain incorrect and later the second processing circuitry may access that data and perform processing using the wrong values, which could lead to the safety-critical functionality being compromised.

Coherency control circuitry may be provided to control access to data from at least part of the shared address space by the first and second processing circuitry according to an asymmetric coherency protocol in which a local-only update of data in a local cache of the first processing circuitry is restricted in comparison to a local-only update of data in a local cache of the second processing circuitry. By restricting the ability of the first processing circuitry to perform local-only updates within a local cache, the chance of an error occurring in the first processing circuitry propagating to data accessible to the second processing circuitry is reduced. This is counter-intuitive since most coherency protocols would treat each processing circuit symmetrically so that requests from one processing circuitry would typically be treated in an equivalent manner to request from another processing circuit. However, by introducing an asymmetric coherency protocol for a system in which different processing circuits have different levels of fault protection/detection, which restricts the ability of the processing circuit with less fault protection/detection to update data only in its local cache, the overall risk of errors in the second processing circuitry can be reduced.

FIG. 1 shows an example of a data processing apparatus 2 comprising two processor cores 4, 6. Each core has a local cache 8 which functions as a level 1 (L1) data cache. Each core also has a memory protection unit (MPU) 9 for storing data defining access permissions to different regions of a shared address space, which control whether a given process executing on the core can access data in each region. It will be appreciated that each core 4, 6 may also include many other components not shown in FIG. 1 for conciseness, such as a processor pipeline, registers, a branch predictor, etc.

Figure 2:
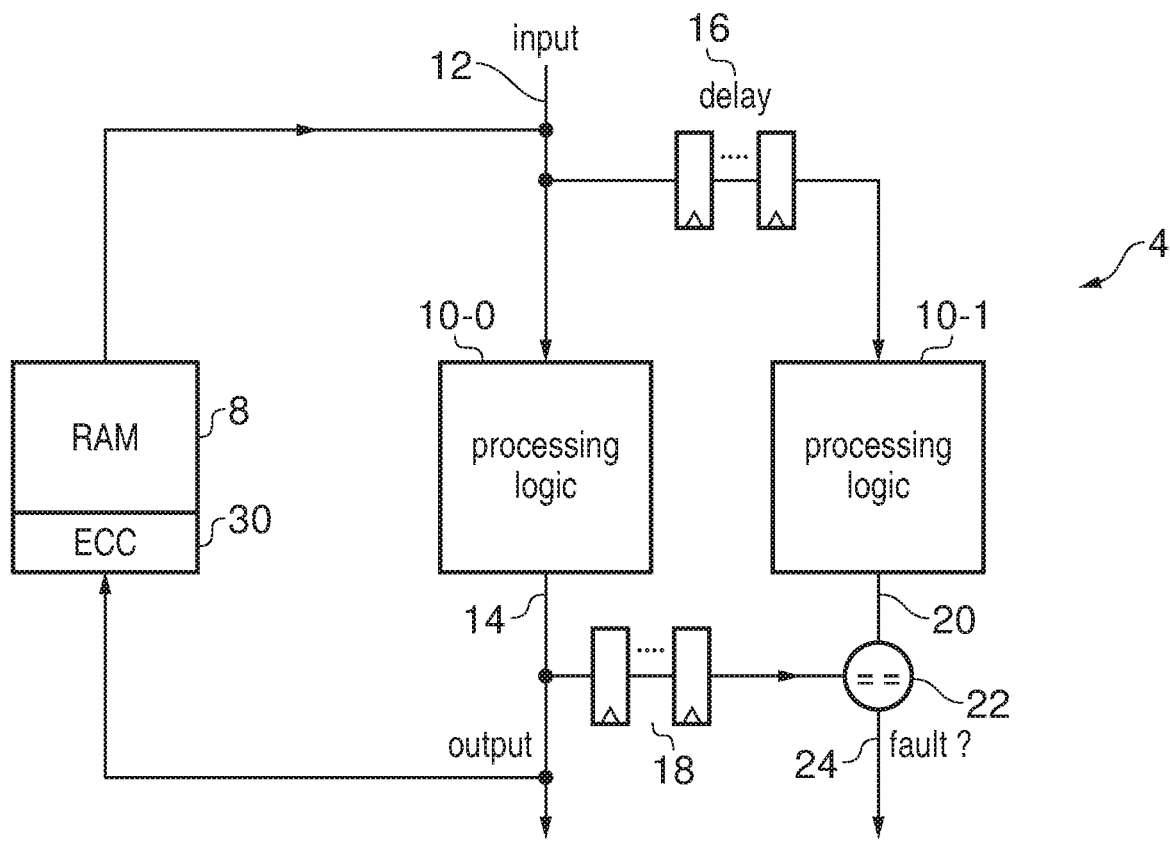
FIG. 2 shows an example of a fault detection mechanism using redundant processing logic and error correcting codes.

The processor core 4 (referred to as core 0) has at least one hardware mechanism for providing fault protection or fault detection, which is not provided for processor core 6 (referred to as core 1). For example, as shown in FIG. 2, core 0 may have redundant processing logic 10, in which two or more copies of the processing logic 10 are driven by the same inputs, so that their outputs can be compared to detect errors occurring from random hardware faults such as particle strikes. For example, as shown in FIG. 2, main processing logic 10-0 receives inputs 12 and processes them to generate an output 14. The inputs 12 are also delayed by delay circuitry 16 (e.g. some flip-flops or latches) and the delayed inputs are provided to a redundant copy of the processing logic 10-1. The output 14 of the main processing logic 10-0 is delayed by further delay circuitry 18 providing an equivalent delay to the delay circuitry 16, and the delayed output is compared against the output 20 of the redundant processing logic 10-1 by a comparator 22. The delay circuits 16, 18 are provided to ensure that the redundant versions of the processing object 10-0, 10-1 are processing the same inputs at different times, so that a temporary glitch in a power supply would not affect both copies of the processing logic 10.

If the comparator 22 detects that the respective outputs match, then subsequent processing of the output 14 continues. If a mismatch in the outputs is detected by the comparator 22, the comparator outputs a signal 24 indicating that a fault was detected, and this may suppress further processing of the erroneous output. For example, when a fault is detected, an exception may be triggered, which can lead to the processing operations which encountered the fault being performed again, or to some other error handling action. It is not essential to wait for the comparison result before starting subsequent processing of the output 14 (waiting for the comparator output before starting subsequent processing would incur a delay which could be problematic for certain time-critical safety-related tasks). Instead, the subsequent processing of the output 14 may commence speculatively while the comparator waits for the delayed output of the redundant logic 10-1 and compares the outputs, and if an error is subsequently detected then the speculative processing of the main output can be halted and an error handling action taken.

The approach shown in FIG. 2 may be referred to as a dual core lock step (DCLS) approach. An alternative would be to provide a triple core lock step (TCLS) system in which there are three redundant copies of the processing logic 10. With TCLS, as well as detecting faults, faults can also be corrected by majority voting. Since when one version of the processing logic 10 is different to the other two, it is likely that the other two processing logic 10 are correct, by using the output generated by the majority of the redundant logic, faults can be corrected without needing to repeat processing operations.

As shown in FIG. 2, the random access memory (RAM) provided for the L1 data cache 8 of core 0 is provided with error correcting codes (ECCs) 30. Alternatively, error detecting codes (EDCs) could be used. Hence, the data stored in the RAM is encoded in a redundant format which enables errors, such as bit flips caused by particle strikes, to be detected (and optionally corrected in the case of ECCs). For example, the EDCs or ECCs may include parity codes, checksums, cyclic redundancy check codes (CRCs), block codes, Hamming codes, and so on. Any known error correcting code or error detecting code mechanism can be used. Hence, when the data is written to the RAM 8, the data is encoded according to the EDC or ECC scheme being used, which either generates a check value to be stored alongside the data or generates an encoded value representing both the data itself and the redundant information. When the data is later read out, the EDC or ECC can be decoded to determine whether an error has occurred (e.g. by checking for inconsistency between the data value and the check value, or for invalid encodings of the encoded value representing the data), to prevent erroneous data being processed. Hence, use of EDCs or ECCs provides another hardware technique for fault detection. The EDCs and ECCs may be generated in hardware by circuitry within the processing logic 10-0, 10-1 so that software executing on the core is unaware that EDCs or ECCs are being used. Similarly, the circuitry for checking the EDCs/ECCs are correct when reading data from the RAM 8 may be provided within the processing logic 10-0, 10-1. By including the EDC/ECC generating and checking circuitry in the processing logic 10-0, 10-1, the duplication provided by the lock step scheme also protects the error checking function, so if a fault causes the EDC/ECC check to fail, this can be detected by divergence of the two copies of the processing logic 10-0, 10-1.

Both the lock step technique and the use of error detecting/correcting codes discussed above are examples of hardware mechanisms for fault detection that use redundancy to detect faults. However, it is also possible to provide core 0 with a hardware fault protection mechanism which reduces the chance of errors occurring in the first place. There are a number of techniques for providing core 0 with hardware which is less susceptible to occurrence of faults than hardware of core 1. For example, at least some parts of the processing logic and other circuit elements of core 0 could be manufactured using a semi-conductor technology which provides increased resistance to hardware faults. For example, core 0 could be formed using silicon on insulator (SOI) or silicon on sapphire (SOS) technology, which can typically withstand a higher level of radiation than standard semiconductor technology. Another option may to use devices comprising silicon carbide or gallium nitride, which may provide greater resistance to errors. Another option is to provide the circuitry of core 0 with some shielding, e.g. surrounding circuitry with a metal ring or casing, to reduce exposure of the device to cosmic rays and other forms of radiation which could trigger hardware errors.

Hence, there are a range of types of hardware mechanism which could be used to protect core 0 against errors or detect when errors occur. This makes core 0 useful for safety-critical applications.

On the other hand, for core 1, the cost of such hardware mechanisms may not be justified and core 1 may be intended primarily for less safety-critical tasks. Hence, core 1 may have a lesser degree of hardware fault protection or detection than core 0. In some cases core 1 may have no hardware for fault protection or fault detection at all, while in other cases some level of fault protection or fault detection could be provided, but less than core 0. Hence, core 1 may correspond to first processing circuitry and core 0 may correspond to second processing circuitry having at least one hardware mechanism providing a greater level of fault protection or detection than is provided for the first processing circuitry.

As shown in FIG. 1, the apparatus 2 may also comprise other elements such as an interrupt controller 40 for detecting interrupts or exceptions and controlling one of the cores 4, 6 to handle the exceptions or interrupts which occur. For example the interrupts could be external interrupts triggered by an external device, or exceptions triggered by the processing performed on one of the cores 4, 6.

Also, the apparatus 2 has a snoop control unit (SCU) 45, which is an example of coherency control circuitry for controlling access to a shared address space by the respective cores 4, 6. The SCU 45 may be a coherent interconnect for example. For example, the cores 4, 6 may share a level two (L2) cache 47 and a main memory 50 for storing data and instructions. The snoop control unit 45 may operate according to a coherency protocol to control access to data from the shared address space so that the respective cores 4, 6 have a coherent view of data, so that when one core updates some data then the other core also sees the updated version. There may be different ways in which the snoop control unit (SCU) 45 may control coherency. For example, some systems may use a snoop based approach, in which when one core wishes to access or update some data, the SCU 45 sends snoop requests to other cores to determine whether the other cores hold a local version of that data, and if so, whether the local version of the data is different to corresponding data from the same address stored in other locations. Alternatively, a directory-based coherency scheme could be used where the snoop control unit 45 maintains a directory tracking which data is stored at which core, so that coherency can be maintained with less snoop traffic, because it would not be necessary to send snoop requests to cores which do not hold the data. Another alternative is an intermediate scheme which uses some level of snooping, but has a snoop filter provided in the SCU 45 which tracks some of the data cached in the local caches 8 of the respective cores 4, 6, so that when the snoop filter indicates that data from a given address is cached in a certain core, then there is no need to issue a snoop to that core, but if the snoop filter does not record whether data from a given address is present at the particular core, then a snoop request may be issued to the particular core to find out whether that data is cached. It will be appreciated that there are a range of different coherency schemes which could be used.

The shared control elements such as the interrupts controller 40 and the snoop control unit 45 as well as the shared data storage 47, 50 may be provided with similar hardware protection or detection mechanisms to core 0, to prevent errors occurring in these shared elements affecting the safety-critical processing of core 0. For example, the snoop control unit 45 or interrupt controller may have redundant control logic and a comparator in a similar way to the redundant processing logic 10 shown in FIG. 2, and the shared storage devices 47, 50 may use error detecting/correcting codes 30 in a similar way to the L1 cache 8 of core 0.

Hence, core 1 may be the part of the system which is most vulnerable to errors. If an error occurs while core 1 is holding some data in a dirty state in its cache 8, this error could silently propagate to core 0, and core 0's hardware fault detection mechanisms may not protect against the error. For example, if core 1 snoops data from core 0 or accesses data from the shared L2 cache 47 or memory 50, loads that data into its L1 cache 8, updates it without updating corresponding data elsewhere, and then encounters a fault which leads to the updated data in the L1 cache 8 being corrupted, core 0 could then issue a request for data from the same address and the coherency mechanism provided by the snoop control unit 45 may lead to the corrupted data in core 1's L1 cache 8 being transferred to core 0, which may then perform processing using the corrupted value. As core 0 would have no means of checking whether the input value it receives is erroneous, then this could lead to errors which could compromise safety critical code.

To address this problem, the snoop control unit 45 can use an asymmetric coherency protocol for controlling access to at least part of the shared address space. In the asymmetric protocol, the ability of core 1 to perform a local-only update of data in its local cache 8 is restricted in comparison to a local-only update of data in the local cache 8 of core 0. A local-only update is an update to data in the local cache 8 without corresponding data being updated in another location. In other words, a local-only update may be an update in a local cache of a particular core which leads to the data transitioning from clean to dirty. As discussed below, there are a variety of ways in which the coherency protocol could be made asymmetric, but in general this means that requests from cores 4, 6 to update data may be handled differently depending on which core issued the request. In some cases, the asymmetric coherency protocol may be used for the entire shared address space so that all addresses accessed by core 1 may use the asymmetric coherency protocol.

Figure 3:
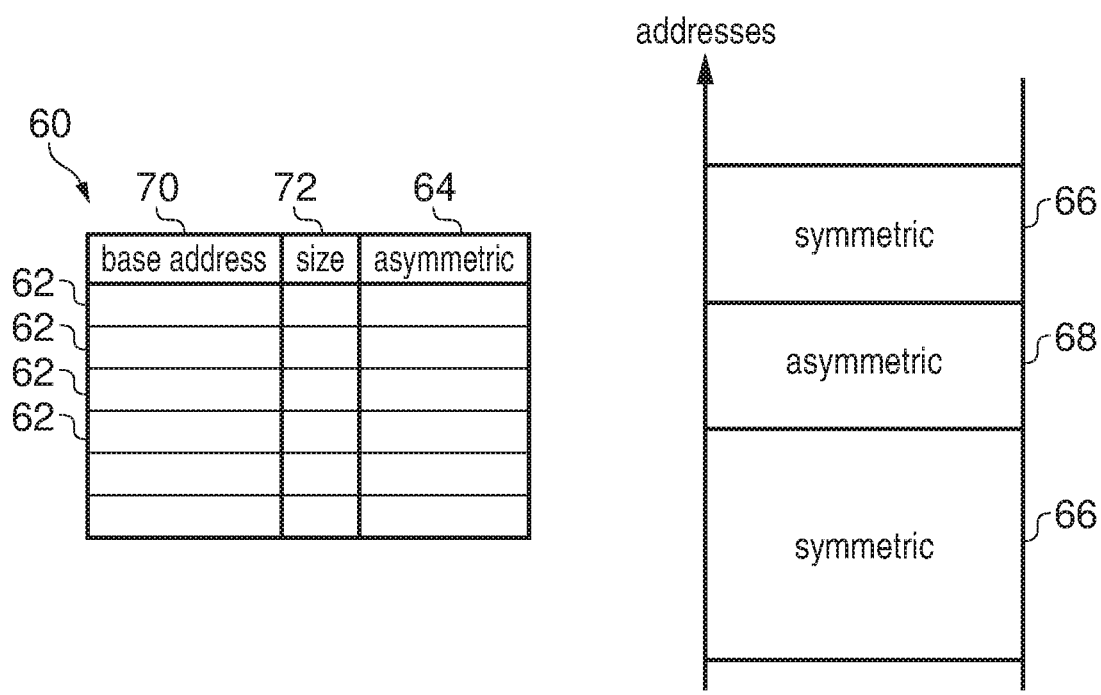
FIG. 3 shows an example of a coherency protection unit for storing data identifying whether respective regions of the shared address space are symmetric protection regions for which access is controlled according to a symmetric coherency protocol, or asymmetric regions for which an asymmetric coherency protocol is used.

Alternatively, as shown in FIG. 1 the snoop control unit may have a snoop protection unit (SPU) 60 which is shown in more detail in FIG. 3. The SPU 60 (also referred to as a coherency protection unit) may have a number of entries 62 corresponding to respective regions of the address space and each entry 62 may identify the corresponding region as either a symmetric region 66 or an asymmetric region 68. For example, a one-bit indicator 64 may indicate whether the region is asymmetric or symmetric. The snoop control unit 45 may handle accesses to addresses within the symmetric regions 66 using a symmetric coherency protocol in which, regardless of whether the request is issued by core 1 or core 0, the data access is handled in an equivalent manner. For example, the regions of the address space which store data or instructions relating to non-safety-critical functions may be allocated as symmetric regions 66. On the other hand, for an asymmetric region 68, the asymmetric coherency protocol is used so that the core 1 has less ability to perform local-only updates of data in its local cache 8 than core 0. The asymmetric regions can be used for storing more safety-critical data or instructions. By providing the ability for the SPU 60 to distinguish symmetric and asymmetric regions in this way, this can provide a better balance between safety and performance since for the symmetric regions core 1 would be able to perform local-only updates of data in its local cache 8 which can improve performance when running code on core 1, whereas local-only updates may be restricted for the asymmetric regions to protect more safety-critical data and instructions against errors.

The SPU 60 could identify the respective regions in a number of ways. In some cases, each entry 62 of the SPU could have a certain fixed mapping to a corresponding region of the address space. Alternatively, as shown in FIG. 3, a variable mapping between entries 62 and regions of the address space could be provided by having each entry specify a base address 70 identifying the start of the corresponding region. In some cases each entry could correspond to a certain fixed size region of the address space, or alternatively an entry 62 may specify a size parameter 72 which identifies a variable size so that larger or smaller regions could be defined corresponding to a single entry. Hence, when a request for a given address is issued from one of the cores then it may be looked up in the SPU 60 to identify whether a symmetric or asymmetric protocol should be used.

Note that the SPU 60 is separate from the MPUs 9 provided in the respective cores. Although it would be possible for the MPUs 9 to be provided with protection attributes which control whether symmetric or asymmetric protocols are used, this would require some transmission of attributes between the cores 6, 8 and the SCU 45, and it may be difficult to make this transmission reliable especially given core 1 lacks the fault protection/detection mechanisms provided in core 0. Therefore, providing a separate SPU 60 in the coherency control circuitry 45 can provide a safer way of maintaining the integrity of the region defining data of the SPU 60. Note that while FIG. 1 shows an example where MPUs 9 are provided in the respective cores 6, 8, in other examples these may be replaced with a memory management unit (MMU) which in addition to storing access permission data identifying which regions of the shared address space are accessible to a given process, may also implement virtual-to-physical address translation between virtual addresses specified by instructions and physical addresses used by the memory system and snoop control unit 45.

When the asymmetric protocol is used (whether for the entire address space or only for selected regions 68 as in FIG. 3), the SCU 45 may handle certain kinds of requests from the cores 4, 6 differently depending on which core issued the requests. For example, a write request to write data to a given address, or a snoop request for checking whether data from a given address is cached at other cores, could be handled differently depending on which core 4, 6 issued the request. For example, core 1 could be permitted to snoop data from core 0 but not take ownership of it, whereas core 0 would be permitted to snoop data from core 1 and take ownership of it so that it may cache it locally in the L1 cache 8 of core 0 and carry on making local-only updates to that data without updating corresponding data within core 1's cache 8 or the L2 cache 47 or memory 50. Alternatively, while core 0 may perform such local-only updates, when core 1 snoops data from core 0 then this could cause the data to be evicted to the next level of the memory system (e.g. the L2 cache 47) and the data may be updated there instead of within the local cache 8 of the core 1, which effectively hands over the responsibility for fault detection and maintaining the integrity of the data to the L2 cache 47 which may have hardware protection mechanisms such as ECCs 30 for protecting against errors.

Figure 4:
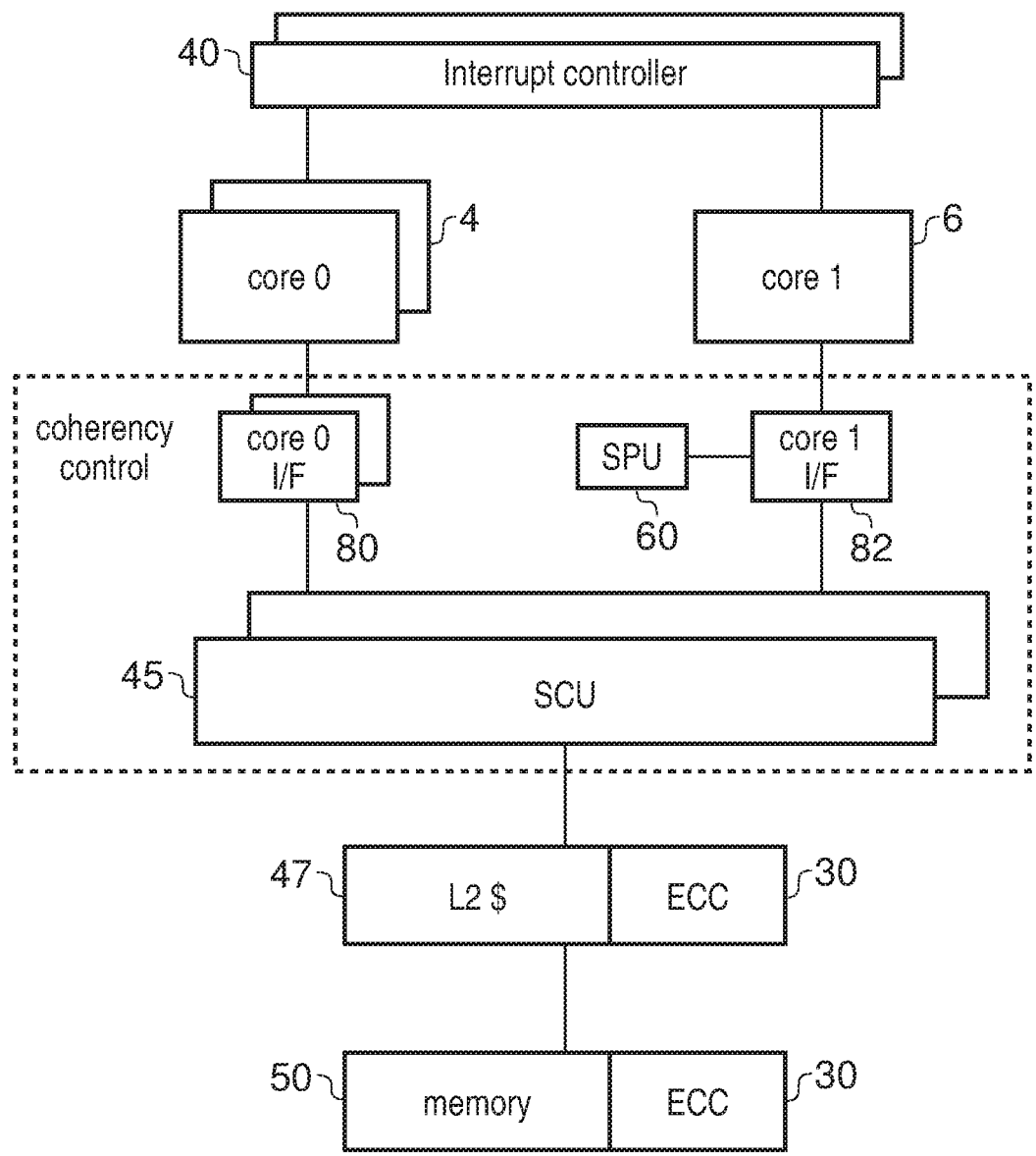
FIG. 4 shows a second example of an apparatus in which the coherency control circuitry includes respective coherency interfaces corresponding to each processing circuit and a snoop control unit for processing requests issued from each interface.

On the other hand, some SCUs may not have the ability to treat a particular kind of request differently depending on which core issued the request. For example, a certain type of request may be defined in the coherency protocol such that it has to be handled in a certain way. In this case, as shown in FIG. 4, as well as the central SCU, the coherency control circuitry could also include respective coherency control interfaces 80, 82 provided for the respective cores 4, 6. The coherency interfaces 80, 82 may be responsible for handling certain types of request from the respective cores 4, 6 differently and mapping these to different kinds of requests sent the to SCU 45 depending on whether the symmetric or asymmetric coherency protocol is being used. The interface 80 corresponding to core 0 may have a hardware fault protection mechanism (such as redundant control logic) which is not provided for core 1's interface 82. Requests to update data may be handled differently depending on which interface is used. For example the core 1 interface 82 may have access to the SPU 60 to determine whether the current request is for an asymmetric or symmetric region, and map a given request from core 1 to different types of requests sent to the SCU depending on which region is accessed, while the core 0 interface 80 could handle the same type of request in the same way regardless of the contents of the SPU 60. Otherwise the system of FIG. 4 may function in a similar way to FIG. 1.

Figure 5:
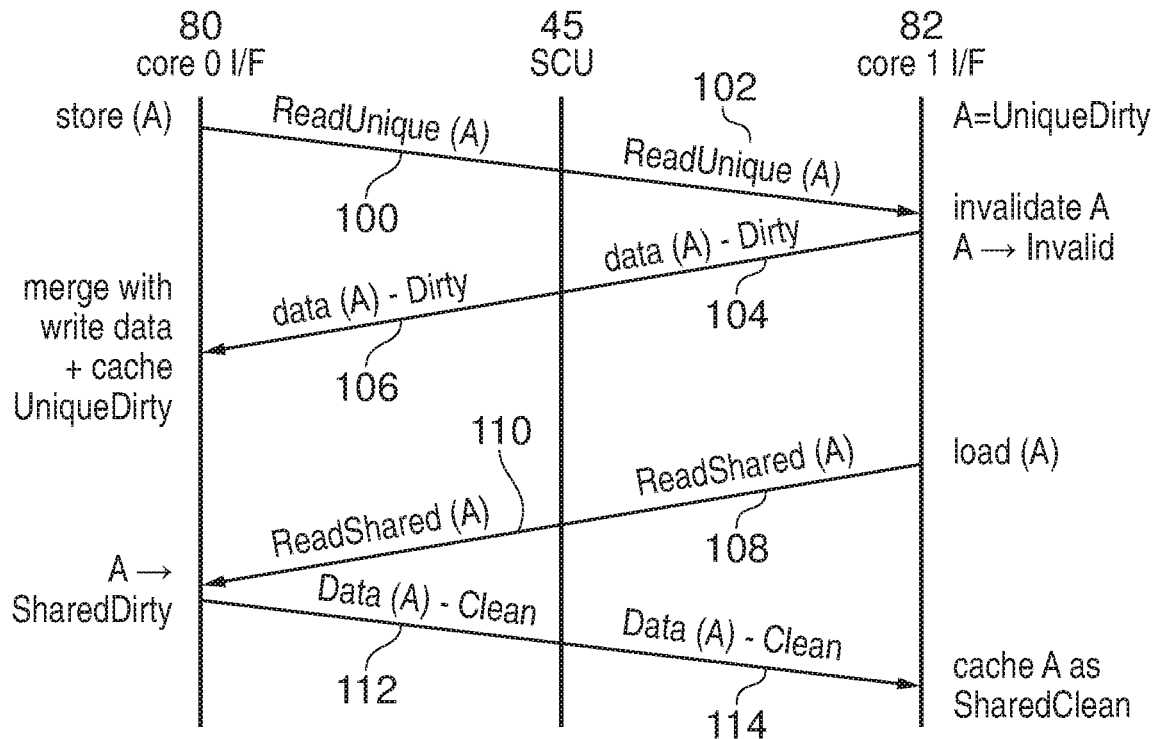
FIG. 5 shows an example of a symmetric coherency protocol.
Figure 5:
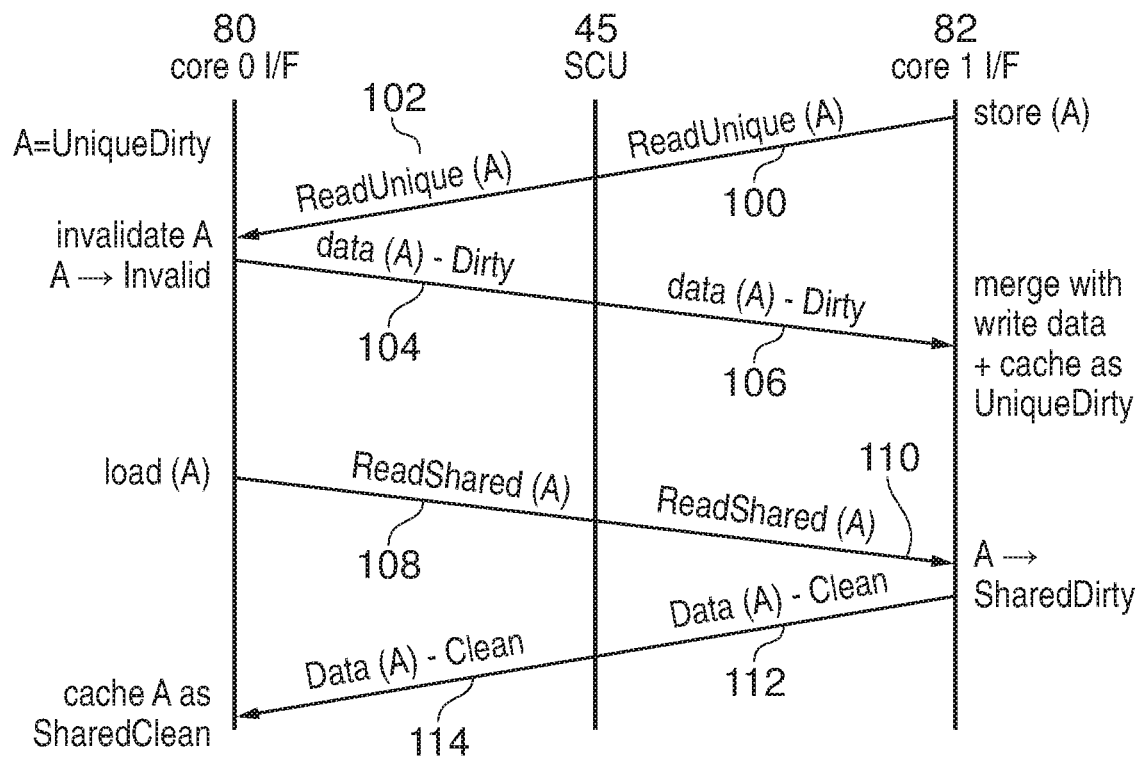
Figure 6:
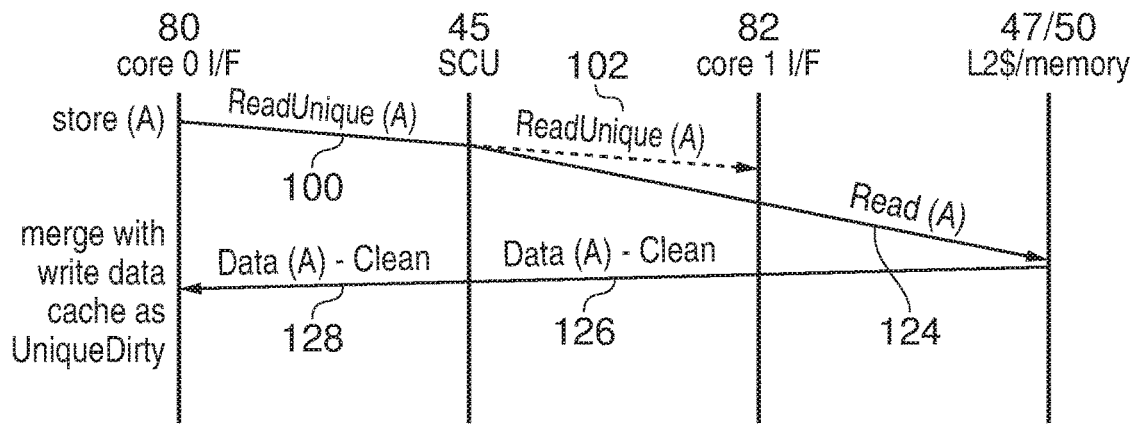
FIG. 6 shows an example an asymmetric coherency protocol.
Figure 6:
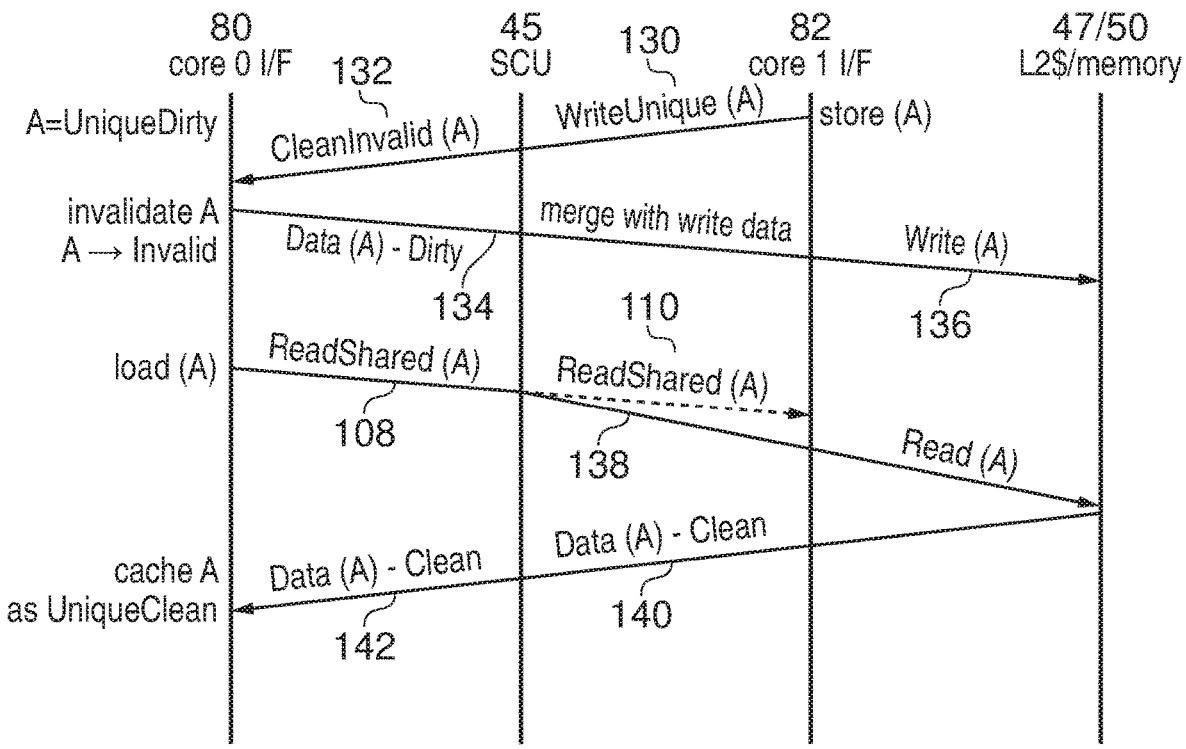

FIGS. 5 and 6 show examples of handling a store request from core 1 or core 0 according to a symmetric coherency protocol and an asymmetric protocol respectively. These examples are based on the AMBA® 4 ACE protocol provided by ARM® Limited of Cambridge, UK. This shows an example of how a known protocol can be modified to behave asymmetrically for respective cores. Before describing the symmetric and asymmetric protocols, some terminology from AMBA 4 ACE is described below.

In the AMBA 4 ACE protocol, each cache line in a local cache 8 may be classified as either valid (storing valid data) or invalid (not storing valid data). When a given cache line is valid, the cache line can be in one of four states defined by the respective combinations of two properties: Unique/Shared and Clean/Dirty. A cache line categorised as Unique stores non-shared data which is not held in any other local cache 8 within the system. For a cache line categorised as Shared, the data from the corresponding address may be held in another local cache 8. If a cache line is Clean, the corresponding data can be invalidated without performing a write back to the next level cache 47 or memory 50. Note that this does not necessarily mean that the local cache 8 holds data which is identical to the corresponding data in the cache 47 or memory 50, but merely means that that particular cache is not responsible for writing back the value. For example, there may be another local cache 8 in a different core which may contain more recent data than the memory it caches, so that it is the other core's cache which is responsible for writing back the value to memory (in this case the other core's cache 8 would cache the data in the Dirty state). On the hand, a cache line which is Dirty contains the latest most up to date data, which differs from the corresponding data in the L2 cache 47 or memory 50 and so if that data is evicted from the local cache 8, it should be written back to memory to maintain coherency. When multiple caches share a cache line, only one of these caches has the cache line in the SharedDirty state, and the other cache lines hold the corresponding data in the SharedClean state.

In summary, there are five possible states for each cache line: the Invalid state and four Valid states corresponding to the respective combinations of the Unique/Shared and Clean/Dirty attributes:

Invalid;

UniqueDirty, indicating non-shared data which has been modified and should be written back to memory when evicted;

SharedDirty, indicating data which may be cached elsewhere in addition to the current cache, and which should be written back to memory when that data is evicted;

UniqueClean, indicating data which is cached solely in the current cache and is consistent with the corresponding data in the next level cache or memory, and so does not need to be written back when evicted or invalidated from the cache;

SharedClean, indicating that the data may also be cached elsewhere but there is no need to write the data back to memory because even if the data in the current cache is more recent than the data is the corresponding location of the next level cache or memory, another cache in a different core has responsibility for writing back the data.

A number of kinds of transactions are defined by AMBA 4 ACE, which can be transmitted between the SCU 45 and the respective cores 60 to maintain coherency. Some of these transactions are referred to in FIGS. 5 and 6. It will be appreciated that these do not show all the possible transactions supported by the protocol, but the relevant ones referred to in FIGS. 5 and 6 include the following:

ReadUnique, which is a request from a given core that the local cache 8 of that core should be provided with the most up to date version of data from a corresponding target address. In response, the data is returned to that core's cache and cached in a Unique state. If the data is also held by another local cache 8, the other cache 8 invalidates the data, and if the invalidated data is Dirty then it may either be provided directly to the local cache which triggered the ReadUnique request and cached as Dirty, or may be written back to memory and cached as Clean.

ReadShared, which is a request issued when a cache requires some data from a given address, but does not require it to be made Unique, so the data may continue to be cached in other local caches. The SCU forwards the ReadShared request to other caches, which return any Dirty data but do not invalidate the data.

WriteUnique, which is a request from a given core to write updated data for a given address back to the shared level 2 cache 47 or main memory system 50. If another local cache 8 holds data corresponding to that address, it invalidates the data.

In the examples shown in FIGS. 5 and 6 the coherency control circuitry is as shown in FIG. 4, where each core has a respective coherency interface 80, 82 which interacts with a central SCU 45 using the transactions discussed above. Hence, a given core 4, 6 may issue a request to store data associated with a given address or load data from a given address, and each interface 80, 82 maps that load/store request to respective transactions as used by the AMBA® ACE™ protocol.

FIG. 5 shows an example of using a symmetric protocol. The top part of FIG. 5 shows an example where core 0 issues a store operation specifying a target address A to be written with updated data. The bottom part of FIG. 5 shows the corresponding operations when core 1 issues such a store request. Hence, FIG. 5 assumes that address A is in one of the symmetric regions 66 of the address space.

As shown in the top part of FIG. 5, in response to the store request for address A issued by core 0, the core 0 interface 80 issues a ReadUnique request 100 specifying address A, which is sent to the snoop control unit 45. The SCU 45 passes on the ReadUnique request 102 to the core 1 interface 82. The core 1 interface 82 determines that data associated with address A is currently cached in the local cache 8 of core 1 in the UniqueDirty state. Therefore, the dirty data 104 from core 1 local cache 8 is returned to the snoop control unit 45 which passes the dirty data 104 on to the core 0 interface 80 at step 106. Meanwhile, the core 1 interface 82 also triggers core 1 to invalidate the cache line which held the data from address A and this cache line now transitions to the Invalid state.

When the dirty data previously cached in core 1 is received by the core 0 interface 80, it controls core 0 to merge this dirty data with the updated data to be written to the cache line in response to the original store request, and the merged data is cached in the local cache 8 of core 0 in the UniqueDirty state, indicating that this data is more up to date than data in any other location and core 0 has the responsibility for writing this back to memory.

If core 1 subsequently requires data from address A again, it issues a load request. In response to the load, the core 1 interface 82 issues a ReadShared request 108 corresponding to address A. The snoop control unit 45 receives the ReadShared request and issues a corresponding ReadShared request 110 to the core 0 interface 80. Now that core 1 wishes to use the data from address A, the data can no longer be maintained as Unique and so the corresponding cache line in core 0 transitions to SharedDirty, and the data from core 0's cache 8 is returned to the snoop control unit at step 112 and forwarded to core 1 interface 82 by the snoop control unit 45 at step 114. The core 1 interface 82 then controls core 1 to cache the data from address A as Shared-Clean. Note that although the data from address A is dirty in core 0's cache 8, it is returned to core 1 in the Clean state to signify that core 1 does not have responsibility for writing this data back to the memory system.

Similarly, as shown in the lower part of FIG. 5, if the core 1 interface 82 detects that core 1 has issued a store request for a given address A, a corresponding set of operations occur. The processing in the top and bottom examples of FIG. 5 is entirely symmetric. Hence, the coherency control circuitry 45, 80, 82 handles the store request in an equivalent manner to trigger the same series of state transitions and transactions via the snoop control unit 45 regardless of which core issued the store or load request. Both core 0 and core 1 can perform a local-only update of data in their local cache 8—see the result of step 106 where the data is cached as UniqueDirty. When relatively non-safety-critical data is being processed, this approach is acceptable because even if an error occurs while core 1 has a cache line in the Dirty state as shown in the lower part of FIG. 5, leading to corruption of this data, this would not affect the safety-critical function being performed by core 0.

However, for safety-critical data, the approach shown in the lower part of FIG. 5 may be a risk because while core 1 holds data as UniqueDirty, it is the only cache which has the latest version of the data, and there is no corresponding value being held elsewhere in core 0's cache 8 or in other parts of the memory system 47, 50. Therefore, for safety-critical data, the asymmetric protocol shown in FIG. 6 can be used instead.

In this example, the asymmetric protocol assumes that core 1 is prohibited from caching any data associated with an address A from one of the asymmetric regions 68. Note that in some cases all regions of the address space may be regarded as asymmetric regions, and in this case the SCU 60 may not be provided and there may not be any symmetric protocol as shown in FIG. 5. Alternatively if the SCU 60 is provided, the use of the asymmetric protocol shown in FIG. 6 can be restricted for certain regions.

The top part of FIG. 6 again shows the case when core 0 issues a store request for an address A for which the asymmetric protocol is being used. Again, at step 100 the core 0 interface 80 issues a ReadUnique request for address A. As shown in part 102 of FIG. 6, optionally the snoop control unit 45 may pass a ReadUnique request to the core 1 interface in the same way as in FIG. 5, but this time the core 1 interface 82 may recognise that the address is in an asymmetric region for which core 1's local cache 8 is not allowed to cache data, and so will not trigger a corresponding invalidation in the cache. Core 1's interface 82 may respond with a snoop response indicating that the data from address A is Invalid in core 1's cache 8. Alternatively, if the snoop control unit 45 itself is able to recognise that core 1 cannot hold any cached data for address A, then the read unique request 102 may not need to be sent to the core 1 interface 82.

The SCU determines that there are no other local caches 8 containing data corresponding to address A, and so a read request 124 is sent to the L2 cache 47 or memory 50, and in response, clean data 126 is returned to the snoop control unit, which is passed on to the core 0 interface at step 128. The core 0 interface 80 then controls core 0 to merge the returned clean data with the data to be written in response to the store request, and again the data is cached in core 0 as UniqueDirty. If core 1 subsequently issues a load request, this may be handled in the same way as shown in FIG. 5 for the symmetric protocol, except that the returned clean data 114 passed to core 1 would simply be used for processing directly (e.g. it could be loaded into a register) and is not allowed to be cached as SharedClean as shown in FIG. 5.

On the other hand, the bottom part of FIG. 6 shows the operations performed when core 1 wishes to store data associated with an address A in the asymmetric region 68. In this case, since core 1 is prohibited from caching data from address A, it cannot locally update the data within its local cache 8, and instead writes the data to the L2 cache 47 or the memory system 50. Therefore, the core 1 interface 82 maps the store request to a WriteUnique request 130 which is issued to the SCU 45. The WriteUnique request indicates that any local caches 8 holding dirty data need to write it back to the memory system before invalidating the data. Hence, a CleanInvalid request 132 is sent to the core 0 interface 8, which forces core 0's cache to invalidate the corresponding cache line for address A and return the dirty data held in that cache line at step 134. The corresponding cache line in core 0 now transitions to Invalid. The snoop control unit 45 merges the dirty data returned from core 0 with the write data of the store request issued by core 1 and writes the merged data to the L2 cache 47 or memory 50 at step 136.

If core 0 subsequently issues a load to address A then this again triggers a ReadShared request 108 as in FIG. 5, which could again trigger a ReadShared request 110 to the core 1 interface, but as core 1 is not allowed to cache data from address A then core 1's interface 82 responds with a signal indicating that the corresponding data is not cached (Invalid) by core 1's local cache 8. Alternatively, if the SCU 45 knows that core 1 cannot cache data then the read shared request 110 could be omitted.

As there is no cache which holds valid data from address A, the SCU 45 triggers a Read request 138 to the L2 cache 47 or memory 50, which leads to clean data 142 being returned to the SCU 45 and then passed to the core 0 interface 8 at step 142. This time, as there are no other local caches 8 which hold the data from address A, core 0 caches the data as UniqueClean.

Hence, as shown in FIG. 6, a given kind of request (e.g. a store request) can be handled differently (e.g. mapped to a WriteUnique request instead of ReadUnique) depending on which core issued the request, so that the core 1 having less fault protection/detection is restricted from making local-only updates in its local cache to reduce the risk of errors being propagated from core 1 to core 0.

It will be appreciated that FIGS. 5 and 6 show an example of providing symmetric or asymmetric protocols which is specific to AMBA® 4 ACE provided by ARM® Limited. It will be appreciated that other protocols could be modified in a similar way. In some cases rather than mapping a store request to different forms of coherency transactions as shown in FIGS. 5 and 6, a common snoop control unit 45 as shown in FIG. 1 could receive the same kind of request from each core but handle them in different ways depending on whether the target address is in a symmetric or asymmetric region. It will be appreciated that not all forms of request issued from core 0 or core 1 need to handled differently and it may just be some types of request which pose a particular risk to the safety critical functionality of core 0 that are handled differently. For example, only certain kinds of snoop request could be handled differently.

While the examples discussed above show only two cores being provided, in other cases there may be three or more cores, which could include multiple sets of second processing circuitry having greater hardware fault detection/protection (similar to core 0), or could include multiple sets of first processing circuitry having less hardware fault detection/protection (similar to core 1). In this case, the asymmetric coherency protocol may restrict the right of any of the first processing circuitry to perform local-only cache updates relative to the second processing circuitry. Note that it is not necessary for each of the first processing circuitry to have identical fault detection/protection mechanisms, or for each of the second processing circuitry cores to have identical fault detection/protection mechanisms. Even if there is some variation in the level of fault detection/protection provided for different instances of the first/second processing circuitry, the asymmetric coherency protocol may still distinguish between the first processing circuitry and the second processing circuitry, with each of the first processing circuitry generally having a smaller degree of fault protection/detection than each of the second processing circuitry.

There are a number of ways in which the asymmetric coherency protocol could ensure that local-only updates in a local cache of the first processing circuitry are restricted in comparison to local-only updates of data in a local cache of the second processing circuitry.

In one example, as shown in FIG. 6, in the asymmetric coherency protocol, the first processing circuitry may be prohibited from caching data from at least part of the shared address space in the local cache of the first processing circuitry. Hence, in this case core 1 is not allowed to hold cache data from that part of the address space at all, so there cannot be any risk of local-only updates being performed. For example, even though core 1 is a full processor core with the ability to execute program instructions in a similar way to core 0 (including performing arithmetic or logic operations), core 1 could be treated effectively as a different kind of master device which does not have full processing capability and has no cache. In some cases, if the asymmetric protocol is being used for the entire address space, then there may be no need for the core 1 to be provided with a local cache 8 at all, since the core 1 would be prohibited from storing any data locally. In this case the hardware scale of core 1 can be reduced. However, this would impact on performance since core 1 would need to trigger accesses to the L2 cache 47 or memory system 50 in order to access any data which can affect not only the performance of the processing performed on core 1 but also the increased amount of memory traffic generated by core 1 may impact on core 0. Therefore, to provide improved performance, it can be useful to provide a local cache 8 in core 16 which can be used for symmetric regions 66 as defined by the SCU 60. Nevertheless, omitting the cache entirely from core 1 is an option.

Another way of enforcing the asymmetric coherency protocol may be to prohibit the first processing circuitry from updating data in its local cache. Hence, while data may be read into the local cache 8 of core 1 from the L2 cache 47 of memory 50, core 1 may not modify the data when it is cached. Hence, core 1 cannot cause data to be made dirty, and there would always be an up to date copy of the equivalent data in another location within the system, which could be in core 0's local cache 8, the L2 cache 47 or the main memory 50. For example, the asymmetric protocol shown in FIG. 6 could be modified so that the ReadUnique request 102 and the ReadShared request 110 sent to core 1 always trigger a response that the data in the local cache 8 of core 1 is either Invalid or Clean, but cannot return a Dirty status. Allowing caching of Clean data at core 1 helps to improve performance at core 1.

In both the above examples (prohibiting caching of data from the asymmetric regions altogether, or allowing caching of clean data but prohibiting local updates in the cache of core 1) there are different options for handling a write request issued by core 1 to request updating of data in the asymmetric region.

In some cases, the coherency control circuitry could signal an exception condition and some action may be taken to handle that exception. For example, core 1 could be prohibited from writing altogether to the regions marked as asymmetric 68. Hence, the SPU 60 may also be used to enforce some security so that core 1 cannot modify data in memory that is associated with safety-critical processing.

Alternatively, when core 1 issues a write request, the coherency control circuitry could trigger a write operation to update the data in at least one further storage location, which could be the L2 cache 47 or memory 50 for example. Hence, in this case core 1 would be permitted to update data in the asymmetric region 68, by triggering a write to the next level of the memory system so that hardware detection mechanisms such as the ECCs 30 provided in the memory system can be used to protect the integrity of the data.

Another option for enforcing an asymmetric coherency protocol may be to allow core 1 to update data within its local cache 8, but ensure that any such updates also trigger writing of the updated data to at least one further storage location (e.g. the L2 cache 47, main memory 50 or the L1 cache 8 of core 0). For example, the L1 cache 8 of core 1 could function as a write-through cache so that any data updated in that cache is also written to the next level of the memory system. In this way, local-only updates are prohibited, so that even if an error occurs in core 1 relating to some internally cached data, there is a corresponding copy elsewhere which is protected against errors by a hardware mechanism so that core 0 is not exposed to the same risk of errors as core 1.

In examples where core 1 is allowed to cache data in its local cache 8 in a clean state, a further safety measure may be for the asymmetric coherency protocol to prohibit core 0 snooping data from the local cache 8 of core 1, so that even if an error occurs in the clean data while stored in core 1's local cache 8, a subsequent read of the same address by core 0 would trigger a request for the data to be read from another location such as the L2 cache 47, memory 50 or the local cache 8 of another core with greater fault detection or protection capability than core 1. In the asymmetric coherency protocol, core 1 may still snoop data from core 0's cache 8 without accessing the L2 cache 47 or memory 50. In contrast, in the symmetric coherency protocol both core 0 and core 1 may snoop clean or dirty cached data from the other core's local cache 8 without accessing the L2 cache 47 or memory 50.

Another way of enforcing an asymmetric coherency protocol could be to impose a time restriction on how long data updated in a local-only update by core 1 may remain dirty without being written back another storage location. For example, if core 1 does have some level of hardware mechanism for fault protection/detection, but not as great a level of protection/detection as is provided in core 0, then it may be an acceptable risk to leave dirty data in core 1 for a short period. In this case, the restriction may be that core 1 may not leave data dirty in its local cache 8 for longer than a certain period, whereas core 0 may leave data dirty in its local cache 8 indefinitely.

Hence, there are a wide range of ways in which the asymmetric protocol could be implemented.

The examples above have discussed particular forms of hardware mechanism for fault protection or detection, such as using lock step processing logic, error detecting or error correcting codes, and hardware techniques for reducing the susceptibility to faults. It will be appreciated that any of these techniques could be used or several of these could be used in combination within core 0, while core 1 has fewer of these mechanisms or mechanisms which do not provide as strong fault detection/protection. In general, the probability of a fault occurring and remaining undetected may be lower for core 0 than core 1. There are a number of ways of implementing this, but in general one way is to have the second processing circuitry process data with a greater level of redundancy than the first processing circuitry. By providing some redundancy then this enables an error to be detected if different redundant values do not match. This redundancy could be in terms of hardware, such as using the lock step technique discussed above to provide multiple copies of redundant processing logic, or could be redundancy at the data level so that the data is encoded to include some redundancy so that the same data value could be represented in a number of different bit patterns to enable errors to be detected. Also, hardware techniques such as hardening circuitry against radiation or shielding it could be used in core 0 as discussed above to reduce the susceptibility of the core to errors occurring in the first place.

Figure 7:
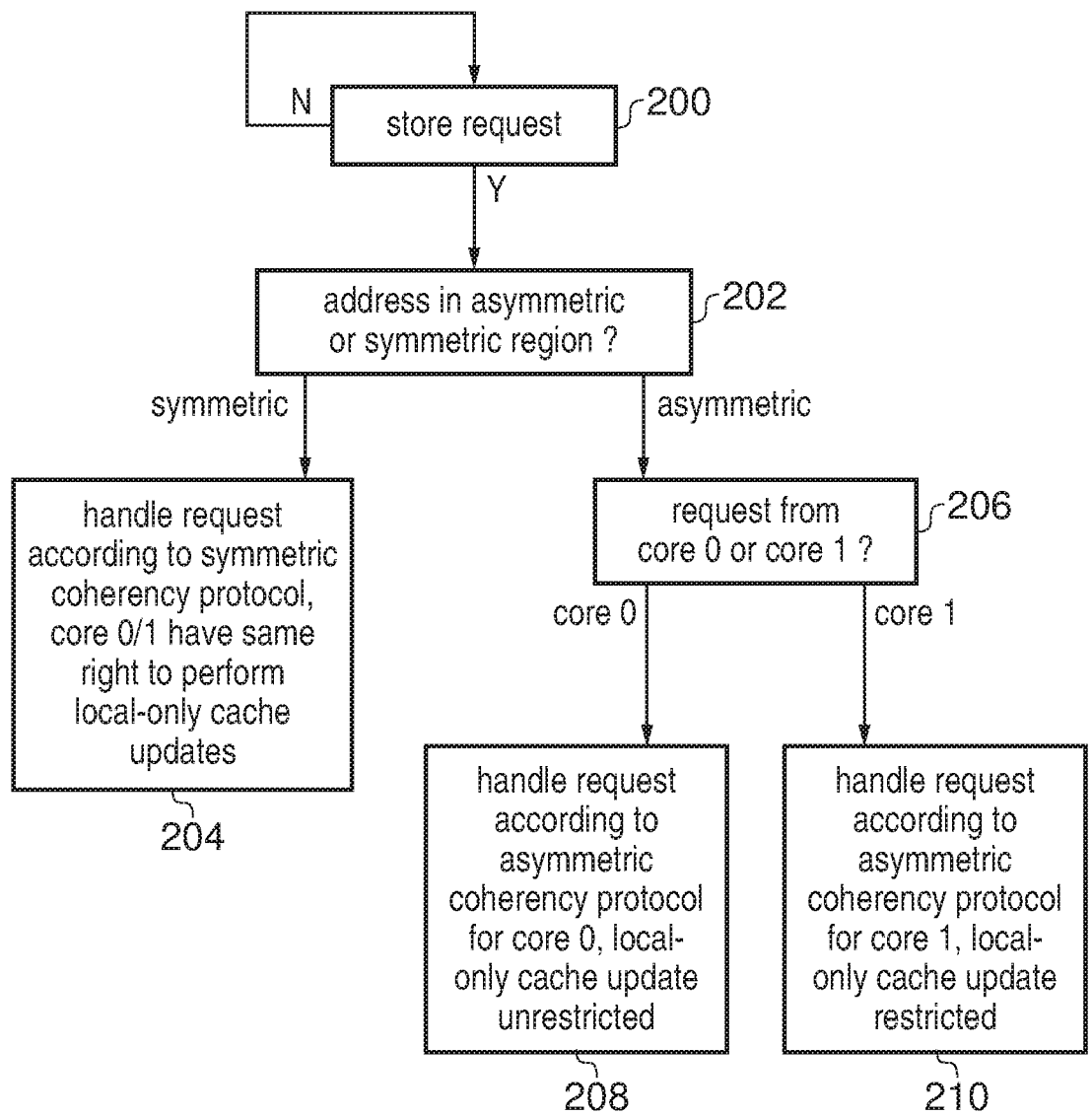
FIG. 7 shows a method of managing coherency.

FIG. 7 shows a flow diagram illustrating a method of handling store requests. At step 200 it is determined whether a store request has been received from one of the cores. If not then the method waits for a store request to be received. When a store request is encountered then at step 202 it is determined whether the target address is in an asymmetric or symmetric region of the address space. For example this can be determined using the SPU 60. It will be appreciated that in some cases there may be no symmetric region and the entire address space may be considered asymmetric.

If the target address is in a symmetric region, at step 204 the request is handled according to a symmetric coherency protocol in which both core 0 and core 1 have the same right to perform local-only cache updates. Hence, the store request may trigger data to be loaded into the local cache 8 of the core which issued the store request, and updated only within the local cache 8, and the request may be handled in the same way regardless of which core issued the store request.

On the other hand, if the target address is in a asymmetric region then at step 206 it is determined whether the request was from core 0 or core 1. If the request was received from core 0 then at step 208 the asymmetric coherency protocol is used for core 0, and local-only cache updates may be unrestricted. When core 0 issues the request, the processing at step 208 could be the same as that performed at step 204 for the symmetric protocol, or could be different. On the other hand, if the request was received from core 1, then at step 210 the asymmetric coherency protocol is used, and a local-only cache update by core 1 is restricted in comparison to core 0 using any of the techniques discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   first processing circuitry configured to execute program instructions;
   second processing circuitry configured to execute program instructions and having at least one hardware mechanism providing a greater level of fault protection or fault detection than is provided for the first processing circuitry; and
   coherency control circuitry to control access to data from at least part of a shared address space by the first processing circuitry and the second processing circuitry according to an asymmetric coherency protocol in which a local-only update of data in a local cache of the first processing circuitry is restricted in comparison to a local-only update of data in a local cache of the second processing circuitry,
   wherein said first processing circuitry for which the local-only update of data in the local cache of the first processing circuitry is restricted according to the asymmetric coherency protocol comprises said first processing circuitry having a lesser level of fault protection or fault detection than said second processing circuitry.

2. The apparatus according to claim 1, wherein in the asymmetric coherency protocol, the first processing circuitry is prohibited from caching data from said at least part of the shared address space in said local cache of the first processing circuitry.

3. The apparatus according to claim 1, wherein in the asymmetric coherency protocol, the first processing circuitry is prohibited from updating data from said at least part of the shared address space in said local cache of the first processing circuitry.

4. The apparatus according to claim 2, wherein in response to a write request from the first processing circuitry to update data from said at least part of the shared address space, the coherency control circuitry is configured to signal an exception condition.

5. The apparatus according to claim 2, wherein in response to a write request from the first processing circuitry to update data from said at least part of the shared address space, the coherency control circuitry is configured to trigger a write operation to update the data from said at least part of the shared address space in at least one further storage location other than the local cache of the first processing circuitry.

6. The apparatus according to claim 1, wherein in the asymmetric coherency protocol, updating of data from said at least part of the shared address space in the local cache of the first processing circuitry triggers writing of the updated data to at least one further storage location other than the local cache of the first processing circuitry.

7. The apparatus according to claim 5, wherein said at least one further storage location has at least one hardware mechanism providing a greater level of fault protection or fault detection than is provided for the first processing circuitry.

8. The apparatus according to claim 3, wherein in the asymmetric coherency protocol, the second processing circuitry is prohibited from snooping data directly from the local cache of the first processing circuitry.

9. The apparatus according to claim 1, wherein in the asymmetric coherency protocol, said local-only update of data from said at least part of the shared address space in the local cache of the second processing circuitry is permitted.

10. The apparatus according to claim 1, comprising a coherency protection unit to store region defining data identifying whether respective regions of the shared address space are symmetric protection regions or asymmetric protection regions;
   wherein the coherency control circuitry is configured to control access to data from said asymmetric protection regions according to said asymmetric coherency protocol; and
   the coherency control circuitry is configured to control access to data from said symmetric protection regions according to a symmetric coherency protocol in which the first processing circuitry and the second processing circuitry have the same right to perform the local-only update of data from the symmetric protection regions in their local cache.

11. The apparatus according to claim 10, wherein at least one of the first and second processing circuitry comprises a memory access control unit to store access permission data identifying which regions of the shared address space are accessible to a given process executed by the first processing circuitry or the second processing circuitry.

12. The apparatus according to claim 1, wherein the second processing circuitry is configured to process data with a greater level of redundancy than the first processing circuitry.

13. The apparatus according to claim 1, wherein the second processing circuitry comprises a plurality of instances of processing logic to perform a common processing operation on the same inputs, and comparison circuitry to compare outputs of each instance of the processing logic.

14. The apparatus according to claim 1, wherein the second processing circuitry is configured to process or store data encoded according to an error detecting codes or error correcting code providing a greater level of fault detection than is provided for the first processing circuitry.

15. The apparatus according to claim 1, wherein the second processing circuitry comprises hardware that is less susceptible to occurrence of faults than hardware of the first processing circuitry.

16. An apparatus comprising:
   first means for executing program instructions;
   second means for executing program instructions, the second means for executing having at least one means for providing, using a hardware mechanism, a greater level of fault protection or fault detection than is provided for the first means for processing; and
   means for controlling access to data from at least part of a shared address space by the first means for executing and the second means for executing according to an asymmetric coherency protocol in which a local-only update of data in a local cache of the first means for executing is restricted in comparison to a local-only update of data in a local cache of the second means for executing,
   wherein said first means for executing for which the local-only update of data in the local cache of the first means for executing is restricted according to the asymmetric coherency protocol comprises said first means for executing having a lesser level of fault protection or fault detection than said second means for executing.

17. A data processing method comprising:
   executing program instructions using first processing circuitry;
   executing program instructions using second processing circuitry having at least one hardware mechanism providing a greater level of fault protection or fault detection than is provided for the first processing circuitry; and
   controlling access to data from at least part of a shared address space by the first processing circuitry and the second processing circuitry according to an asymmetric coherency protocol in which a local-only update of data in a local cache of the first processing circuitry is restricted in comparison to a local-only update of data in a local cache of the second processing circuitry,
   wherein said first processing circuitry for which the local-only update of data in the local cache of the first processing circuitry is restricted according to the asymmetric coherency protocol comprises said first processing circuitry having a lesser level of fault protection or fault detection than said second processing circuitry.

18. The apparatus according to claim 1, wherein the first processing circuitry comprises a first processor core and the second processing circuitry comprises a second processor core.

\* \* \* \* \*